Figure 1:
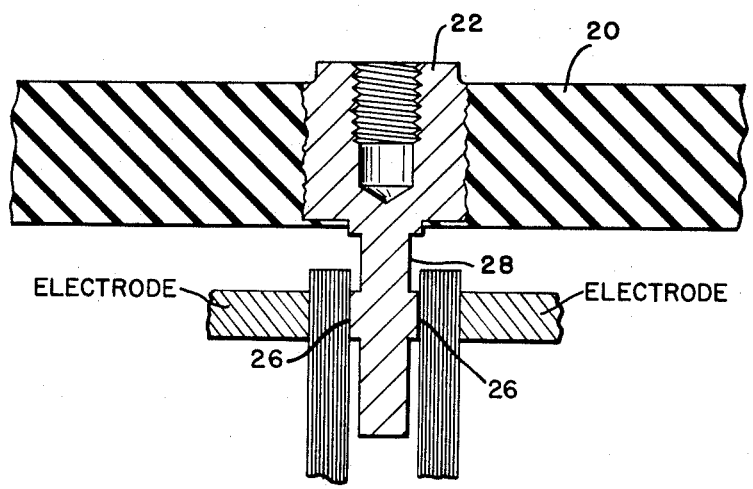

Jan. 5, 1965     K. P. SHETTERLY     3,164,711
WELDING METHOD
Filed Aug. 13, 1962

INVENTOR.
Karl P. Shetterly
BY
His Attorney

3,164,711
WELDING METHOD
Karl P. Shetterly, Anderson, Ind., assignor to General Motors Corporation, Detroit, Mich., a corporation of Delaware
Filed Aug. 13, 1962, Ser. No. 216,629
3 Claims. (Cl. 219—93)

This invention relates to a welding method and is particularly concerned with a method for welding a plurality of thin metal straps to a heavier metal workpiece.

It is appreciated that welding operations on thin metal straps against heavy workpieces cause serious processing problems due to the tendency of the thin metal in the strap to burn and melt out at the point of contact of the welding electrode.

It is, therefore, an object of this invention to provide a method of welding a plurality of straps of the character described to a heavier workpiece wherein the straps are welded without burning and wherein a satisfactory and permanent weld is obtained not only between the several straps but also between the straps and the heavier workpiece.

Specifically, the invention is directed to a method for welding a plurality of nickel straps or tabs coming from various cell groups of a nickel cadmium battery to a battery lug or connection also formed from nickel. In these assemblies there are many cell groups in a battery and this condition often requires the welding of as high as from 30 to 50 straps together and to a post or lug. This obviously creates a considerable problem since welding thin metal in the order of from .005 to .007 inch requires great care to prevent burning at the weld area.

The present invention solves these problems and produces a satisfactory strong weld wherein all of the straps or tabs are integrated with one another and with the battery lug or post.

Further objects and advantages of the present invention will be apparent from the following description, reference being had to the accompanying drawings wherein preferred embodiments of the present invention are clearly shown.

Figure 2:
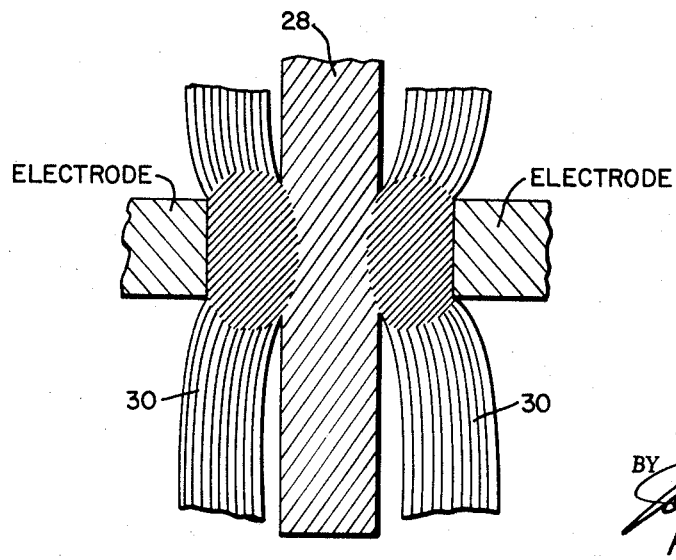

In the drawings:

FIGURE 1 is a drawing in cross section of a portion of a cell cover showing a battery lug in place therein; and FIGURE 2 is an enlarged view in vertical section showing the improved welded connection between the battery lug and a plurality of metal tabs.

Specifically referring to the drawings, a cross section of a portion of a battery cell cover is shown at 20 with a battery lug or connector 22 molded therein. The connector may be preformed for electrical connections to include a pair of opposed welding projections 26 at the lower portion 28 of the connection 22, which portion 28 is positioned within the battery in the completed assembly.

A cross section of this assembly is shown in FIGURE 2 wherein a plurality of plate tabs or straps 30 coming from various cells group within the battery are welded to the extension 28. In this instance there are 20 tabs shown, 10 on each side of the extension 28 and these are positioned in direct contact with the welding projections 26 during the welding operation. Each of the straps or tabs 30 is made of nickel and is quite thin. In the present instance the foils are between .005 and .007 of an inch in thickness. The post or extension 28 is about 3/16 of an inch thick, which presents a considerably greater thickness of metal than is present in any of the tabs. On opposite sides of the extension the welding projections 26 are shown and these extend approximately .025 of an inch outwardly from the surface of the extension and are about .16 inch wide. The tabs 30 are stacked in juxtaposed relation and are positioned against the projections 26 on opposite sides of the extension 28 and are held thereto by pressure applied by the electrodes, in this instance a force of about 750 lbs. per square inch. A 50 kva. welder is used on the No. 8 high tap which provides 7.58 volts open circuit, and the welding current is passed for 16 cycles. At the end of this operation a weld is perfected and shows no burning of the thin metal straps or tabs 30. This is evidenced schematically in FIGURE 2 which is a somewhat enlarged cross section of the welded area. It will be seen that the welded section has integrated so that a strong weld having good electrical properties without burning is formed.

In the present instance the use of a welding projection together with a stack of foils or thin metal tabs overcome burning problems which are usually present in operations of this character.

It is apparent that the thickness of the tabs may vary considerably and in this instance it is desirable to provide sufficient welding projection metal to perfect the weld. This, of course, is best derived by trial for the specific application that is to be made of the method. In each instance, sufficient metal should be provided to prevent burning at the weld area. Similarly, variations in welding current may be used providing the weld formed is satisfactory. Here again, the variations are best derived by trial since it is apparent that the very thin tabs create problems not present when welding heavy cross section materials.

While the embodiments of the present invention as herein disclosed, constitute preferred forms, it is to be understood that other forms might be adopted.

What is claimed is as follows:

1. In a method for welding a plurality of thin metal straps to a heavier workpiece of the same metal the steps comprising; providing a thin substantially flat-faced welding projection on said workpiece, stacking said straps in juxtaposed relation, holding the stacked strap against said flat-faced projection, applying high pressure thereto by means of opposed welding electrodes to establish good electrical contact throughout the stack and the projection and then passing a high welding current through said electrodes, straps and said projection for causing said projection to integrate into a continuous weld with said juxtaposed straps, said projection being dimensioned to be substantially absorbed into the welded joint.

2. In a method for welding a plurality of thin, foil-like nickel straps to a heavier nickel workpiece the steps comprising; providing a nickel workpiece with a thin substantially flat welding projection thereon, aligning said nickel straps in juxtaposed contacting relation to one another, positioning the stacked straps against the welding projections, applying high pressure thereto by means of opposed welding electrodes to maintain the position thereof and then passing a sufficiently high welding current through said electrodes, straps and through said projection for causing integration of the projection and the juxtaposed straps into a continuous weld without burning or otherwise injuring the straps, said projection being dimensioned to be substantially absorbed into the welded joint.

3. In a method for welding a plurality of thin nickel straps to a heavier nickel attachment means, the steps providing a thin substantially flat-faced welding projection on the attachment means, superimposing a plurality of relatively thin nickel straps into a stack wherein the straps are in juxtaposed relation, positioning the stack with the surface of one outside strap in contact with said substantially flat-faced projection on said attachment means, compressing the stack against the attachment means by means of opposed and aligned electrodes bearing on the attachment means and on an outside strap of said stack and in alignment with said projection for creating a good electrical path of relatively low resistance through said straps and projection, passing a current through said electrodes sufficient to cause said projection to melt and integrate with adjacent portions of said straps and to form a solidified, continuous weld area having an extent greater than said projection without burning the said straps, said projection being dimensioned to be substantially absorbed into the welded joint.

References Cited in the file of this patent

UNITED STATES PATENTS

| | | |
|---|---|---|
| 1,492,992 | Lachman et al. | May 6, 1924 |
| 1,736,811 | Wysocki | Nov. 26, 1929 |
| 1,839,431 | Webster | Jan. 5, 1932 |
| 2,190,621 | Baer | Feb. 13, 1940 |
| 2,250,617 | Argentin | July 29, 1941 |
| 2,293,247 | Fentress | Aug. 18, 1942 |
| 2,432,299 | Eggleston | Dec. 9, 1947 |

FOREIGN PATENTS

| | | |
|---|---|---|
| 429,459 | Great Britain | May 30, 1935 |